United States Patent
Sivakumar et al.

(10) Patent No.: US 12,277,859 B2
(45) Date of Patent: Apr. 15, 2025

(54) COOPERATIVE OPERATION OF VEHICLES

(71) Applicant: International Business Machines Corporation, Armonk, NY (US)

(72) Inventors: Gandhi Sivakumar, Bentleigh (AU); Smitkumar Narotambhai Marvaniya, Bangalore (IN); Vijay Ekambaram, Chennai (IN); Padmanabha Venkatagiri Seshadri, Mysore (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 17/227,461

(22) Filed: Apr. 12, 2021

(65) Prior Publication Data
US 2022/0327930 A1  Oct. 13, 2022

(51) Int. Cl.
*G08G 1/0968* (2006.01)
*G06Q 20/36* (2012.01)
(Continued)

(52) U.S. Cl.
CPC ... *G08G 1/096833* (2013.01); *G06Q 20/3672* (2013.01); *G06Q 30/0208* (2013.01);
(Continued)

(58) Field of Classification Search
CPC .................................................. G06Q 30/0208
(Continued)

(56) References Cited

U.S. PATENT DOCUMENTS 8,457,827 B1  6/2013  Ferguson
8,660,735 B2  2/2014  Tengler
(Continued)

FOREIGN PATENT DOCUMENTS

CN  109118758 A  * 1/2019  ........... G08G 1/0116
DE  102017216202 A1 * 3/2019
(Continued)

OTHER PUBLICATIONS

L. Hobert, A. Festag, I. Llatser, "Enhancements of V2X communication in support of cooperative autonomous driving," in IEEE Communications Magazine, vol. 53, No. 12, pp. 64-70, Dec. 2015, URL: https://ieeexplore.ieee.org/stamp/stamp.jsp?tp=&arnumber=7355568&isnumber=7355551 (Year: 2015).*
(Continued)

*Primary Examiner* — Meredith A Long
*Assistant Examiner* — Melinda Gieringer
(74) *Attorney, Agent, or Firm* — Tutunjian & Bitetto, P.C.; Kimberly Zillig (57) ABSTRACT

A processor may receive a route request from a user. The processor may receive data associated with predicted routes of one or more nearby vehicles. The processor may select a recipient vehicle from the one or more nearby vehicles, where the recipient vehicle is selected based on recipient selection criteria. The processor may determine one or more driving change requests for the recipient vehicle. The processor may send the one or more driving change requests and a proposed token to the recipient vehicle. The processor may provide a token to the recipient vehicle in response to the recipient vehicle implementing the driving change requested.

14 Claims, 5 Drawing Sheets

(51) Int. Cl.
*G06Q 30/0208* (2023.01)
*G06T 19/00* (2011.01)
*G08G 1/0967* (2006.01)

(52) U.S. Cl.
CPC . *G08G 1/096716* (2013.01); *G08G 1/096775* (2013.01); *G06T 19/006* (2013.01)

(58) Field of Classification Search
USPC ....................................................... 705/14.11
See application file for complete search history.

(56) References Cited

U.S. PATENT DOCUMENTS

| | | | |
|---|---|---|---|
| 9,355,423 | B1 | 5/2016 | Slusar |
| 9,489,635 | B1* | 11/2016 | Zhu ....................... G06V 10/987 |
| 9,767,516 | B1 | 9/2017 | Konrardy |
| 10,445,758 | B1* | 10/2019 | Bryer ...................... G06Q 40/08 |
| 2002/0178255 | A1 | 11/2002 | Hobart |
| 2009/0210242 | A1* | 8/2009 | Black ................... G06Q 10/047 705/14.1 |
| 2013/0151412 | A1 | 6/2013 | Spahl |
| 2014/0095272 | A1 | 4/2014 | Zafiroglu |
| 2014/0267398 | A1 | 9/2014 | Beckwith |
| 2015/0081404 | A1 | 3/2015 | Basir |
| 2015/0170310 | A1* | 6/2015 | Amento ............... G06Q 10/047 705/13 |
| 2016/0036917 | A1 | 2/2016 | Koravadi |
| 2018/0137594 | A1* | 5/2018 | Marco ............ G06Q 10/063114 |
| 2019/0043364 | A1* | 2/2019 | Jumpertz ........ B60W 30/18163 |
| 2019/0188800 | A1* | 6/2019 | Slusar .................... G08G 1/0962 |
| 2019/0265059 | A1 | 8/2019 | Warnick |
| 2019/0299983 | A1 | 10/2019 | Shalev-Shwartz |
| 2019/0304299 | A1* | 10/2019 | Feng ....................... G06Q 50/40 |
| 2019/0310636 | A1* | 10/2019 | Halder ................. G05D 1/0223 |
| 2019/0370906 | A1* | 12/2019 | Sakayanagi ........ G06Q 30/0224 |
| 2020/0160704 | A1* | 5/2020 | Choi ................ G08G 1/096716 |
| 2020/0192393 | A1* | 6/2020 | Aragon ................ G05D 1/0221 |
| 2020/0256699 | A1* | 8/2020 | Robeson .............. G08G 1/0141 |
| 2020/0353622 | A1* | 11/2020 | Borges Oliveira .. G06V 10/764 |
| 2021/0095981 | A1* | 4/2021 | Sumikawa ............. G07C 5/008 |
| 2021/0264782 | A1* | 8/2021 | Abbas ............. G08G 1/096741 |
| 2021/0389138 | A1* | 12/2021 | Morton ................ G08G 1/0145 |
| 2022/0126864 | A1* | 4/2022 | Moustafa .............. G06T 1/0007 |
| 2023/0131851 | A1* | 4/2023 | Yu ........................ G01S 13/931 701/301 |

FOREIGN PATENT DOCUMENTS

| | | |
|---|---|---|
| IN | 201641033569 | 4/2018 |
| WO | 2009105288 A3 | 8/2009 |
| WO | 2017220169 A | 12/2017 |

OTHER PUBLICATIONS

A. Benterki, M. Boukhnifer, V. Judalet and M. Choubeila, "Prediction of Surrounding Vehicles Lane Change Intention Using Machine Learning," 2019 10th IEEE International Conference , 2019, pp. 839-843, accessed at https://ieeexplore.ieee.org/document/8924448?source=IQplus (Year: 2019).*

Anonymous. "Automotive." Accessed Dec. 22, 2020. 4 pages. Published by IBM. https://www.ibm.com/thought-leadership/institute-business-value/industry/automotive.

Anonymous. "Design smarter cars, deliver new capabilities and enhance experiences." Accessed Dec. 22, 2020. 6 pages. Published by IBM. https://www.ibm.com/internet-of-things/explore-iot/vehicles/automobiles.

Curry, D., "Apple patents overlaying details on augmented reality glasses." Published Aug. 2, 2017. 4 pages. Published by readwrite. https://readwrite.com/2017/08/02/apple-ar-patent-al1/.

Husband, B., "Keeping up in the patent race for connected cars." Published Apr. 26, 2017. 5 pages. Published by Carpmaels & Ransford LLP. https://www.carpmaels.com/keeping-patent-race-connected-cars/.

Kaushik, et al., "Overtaking Maneuvers in Simulated Highway Driving using Deep Reinforcement Learning." Published Jun. 2018. 7 pages. In 2018 IEEE Intelligent Vehicles Symposium (IV) (IV'18). Centre for Robotics International Institute of Information Technology Hyderabad—500 032, India.

Mell, et al., "The NIST Definition of Cloud Computing," Recommendations of the National Institute of Standards and Technology, U.S. Department of Commerce, Special Publication 800-145, Sep. 2011, 7 pgs.

Seshia, S., "Introduction to Temporal Logic." Accessed Dec. 22, 2020. 28 pages. https://people.eecs.berkeley.edu/~sseshia/fmee/lectures/TemporalLogicIntro.pdf.

Shitov, Y., "Column subset selection is NP-complete." Published Jan. 2017. 6 pages. In Linear Algebra and its Applications. Published by ResearchGate. https://www.researchgate.net/publication/312216161_Column_subset_selection_is_NP-complete.

Singh, V., "How this company is planning to provide a smart driving assistant for our cars?" Published Jun. 13, 2017. 5 pages. Published by Vipin Singh. http://www.whatafuture.com/smart-driving-assistant/.

Thompson, C., "Honda wants to give you superhuman vision while driving." Published Sep. 9, 2016. 13 pages. Published by Business Insider India. https://www.businessinsider.in/Honda-wants-to-give-you-superhuman-vision-while-driving/articleshow/54253702.cms.

Wong, W., "Battery Charged Remotely Using RF Power." Published May 31, 2011. 3 pages. Published by ElectronicDesign. https://www.electronicdesign.com/technologies/boards/article/21793346/battery-charged-remotely-using-rf-power.

* cited by examiner

COOPERATIVE OPERATION OF VEHICLES

BACKGROUND

The present disclosure relates generally to the field of cooperative vehicle operation, and more specifically to selecting recipient vehicles for driving changes based on recipient selection criteria.

Vehicle traffic on the roads is increasing. Some vehicles may be driverless vehicles with self-driving control systems. Some vehicles may have navigation systems to guide drivers.

SUMMARY

Embodiments of the present disclosure include a method, computer program product, and system for selecting recipient vehicles for driving changes based on recipient selection criteria.

In some embodiments, a processor may receive a route request from a user. The processor may receive data associated with predicted routes of one or more nearby vehicles. The processor may select a recipient vehicle from the one or more nearby vehicles, where the recipient vehicle is selected based on recipient selection criteria. The processor may determine one or more driving change requests for the recipient vehicle. The processor may send the one or more driving change requests and a proposed token to the recipient vehicle. The processor may provide a token to the recipient vehicle in response to the recipient vehicle implementing the driving change requested.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cooperative vehicle operation, and more specifically to selecting recipient vehicles for driving change requests based on recipient selection criteria. While the present disclosure is not necessarily limited to such applications, various aspects of the disclosure may be appreciated through a discussion of various examples using this context.

In some embodiments, a processor may receive a route request from a user. In some embodiments, the user may be operating a vehicle (e.g., car, truck, motorcycle, tractor, etc.) or the user may be the/have input for the control system of a driverless vehicle. In some embodiments, the route request from the user may involve a desired speed, a desired time (e.g., destination time or travel time), a destination point, a desired traffic maneuver (e.g., overtake another vehicle, merge into traffic, cross intersection, etc.), or combination of thereof (e.g., go from scene of an emergency to a hospital in 20 minutes). In some embodiments, the route request may relate to driving paths (e.g., drive on Highway 1 to reach the hospital), other vehicles (e.g., overtake other vehicles by entering the left lane), or other objects or events (e.g., avoid pothole, downed tree, icy roads, road construction, etc.).

In some embodiments, the processor may receive data associated with predicted routes of one or more nearby vehicles. In some embodiments, the position, speed, and trajectory (e.g., driving paths) of nearby vehicles may be observed and used to predict the future position, speed, and trajectories of the nearby vehicles. In some embodiments, an artificial intelligence ("AI") model may be used to determine the predicted routes of the one or more nearby vehicles. In some embodiments, a classifier may be trained to predict the speed of a vehicle based on nearby vehicles that are connected and based on live traffic information. In some embodiments, the classifier may be trained to predict the driving path based on nearby vehicles' positions, driving speed, vehicle features, driver skill, live traffic information, etc.

In some embodiments, the processor may select a recipient vehicle from the one or more nearby vehicles, where the recipient vehicle is selected based on recipient selection criteria. In some embodiments, the processor may determine one or more driving change requests for the recipient vehicle. In some embodiments, the recipient vehicle may be selected based on the predicted route of the recipient vehicle and one or more selection criteria. In some embodiments, the one or more driving changes for the recipient vehicle may be designed to allow the user to accomplish the task of the route request (e.g., travel along the route requested). For example, in order for the user to merge onto a busy highway with bumper-to-bumper traffic, a recipient vehicle may be selected from the nearby vehicles on the highway based on the predicted route of the recipient vehicle. The recipient vehicle may be requested to slow down to a certain speed in order to provide a gap in the bumper-to-bumper traffic for the vehicle of the user to merge onto the highway.

In some embodiments, the recipient vehicle may be selected and/or the driving change for the recipient may be determined using an AI model. In some embodiment, the recipient selection criteria may relate to a prediction about which vehicles may most effectively implement driving changes that allow the user to achieve the requested route. Factors that may affect the effectiveness of implementing driving changes may include the current speed of each vehicle, current position of each vehicle, current path of each vehicle, predicted speed of each vehicle, predicted position of each vehicle, predicted path of each vehicle, traffic conditions for the vehicles, weather or other environmental conditions (e.g., potholes, ice, road construction, etc.), the feasibility of making driving changes for each vehicle, the safety of making driving changes for each vehicle, the likelihood that the vehicle will implement requested driving changes given a token or incentive offered, past participation of the vehicle in cooperative driving using incentives, etc.

In some embodiments, the processor may send a driving change request and a proposed token to the recipient vehicle. In some embodiments, the processor may provide a token to the recipient vehicle in response to the recipient vehicle implementing the driving change requested. In some embodiments, after the requested driving change is implemented, an intelligent system may authenticate the transaction and make a token (e.g., crypto token, coin, etc.) or incentive accessible to the recipient vehicle. Continuing the previous example, as a request is sent to the recipient vehicle to slow down to a certain speed, a proposed token, or a proposal of a token, may be sent to the recipient vehicle to incentivize the recipient vehicle to implement the suggested driving change. The proposed token may be released and made available to the recipient vehicle after the recipient vehicle implements the driving change requested or commits to implementing the driving change. In some embodiments, an incentive may be proposed to the recipient vehicle, but the recipient vehicle may counteroffer and request a different incentive. The token that is counteroffered (and then accepted by the user) may be provided to the recipient vehicle in response to the recipient vehicle implementing the driving change requested. In some embodiments, the proposed token and/or the token provided to the recipient vehicle may be monetary payment, token payment (e.g., credits to be used on another occasion), the sharing of resources (e.g., high speed internet connectivity, sensors, processing power, batteries, etc.), or any combination thereof.

In some embodiments, the processor may receive additional information regarding the current position, movement, or paths of the one or more nearby vehicles or the recipient vehicles after the recipient vehicle implements the driving change, partially implements the driving change, or does not implement the driving change. In some embodiments, the additional information may be used to predict the routes for the one or more nearby vehicles and/or the recipient vehicle. In some embodiments, the processor may determine additional driving change requests for the recipient vehicle that may be needed (based on observing the driving behavior of the recipient vehicle and/or nearby vehicles) for the user to achieve the route request.

In some embodiments, the recipient selection criteria may include the safety of the recipient vehicle to implement the driving change. For example, a recipient vehicle (and driving change requests for the recipient vehicle) may not be selected unless it is safe for the recipient vehicle to make the driving change based on the predicted traffic conditions in the vicinity of the recipient vehicle. The safety of the potential driving change for the recipient vehicle may be assessed using an AI model that receives data about the predicted route of the recipient vehicle and other vehicles in proximity to the recipient vehicle.

In some embodiments, the recipient selection criteria may include the token for the recipient vehicle to implement the driving change. In some embodiments, the value, amount, or type of token predicted to provide sufficient incentive for the driver of the recipient vehicle to make the driving changes requested may be assessed when determining which vehicle is selected to make a driving change. In some embodiments, based on the type of vehicle and the traffic conditions, it may be determined that a particular vehicle should not be selected to make a driving change. For example, an emergency response vehicle (e.g., police car) may request to overtake other vehicles on route to the scene of an emergency. In some embodiments, the cooperative driving system may not select another emergency response vehicle (e.g., ambulance) to overtake and may instead select a non-emergency response vehicle to request to slow down (e.g., to be overtaken when merging, etc.).

In some embodiments, the recipient selection criteria may include a predicted likelihood of the recipient vehicle to implement the driving change. In some embodiments, the reliability of a vehicle in implementing the driving changes requested may be a factor in assessing which nearby vehicle to select for the driving change request. The AI model may be able to predict how likely it is that a vehicle will implement the driving changes requested given the incentives (e.g., token) proposed based on information such as type of vehicle, traffic conditions, specific information about the driver, identifying information from the vehicle providing the vehicle's history of implementing requested driving changes, type of driving change requested, time of day, weather conditions, other surrounding conditions (e.g., road construction or the timing of an event (e.g., sports game), etc.

In some embodiments, the processor may further communicate with two or more recipient vehicles and generate respective driving change requests and proposed tokens for the two or more recipient vehicles. In some embodiments, the processor may receive from the two or more recipient vehicles updated token requests and estimate a combined token value to be provided to the two or more recipient vehicles to implement the route request from the user. In some embodiments, the processor may select more than one recipient vehicles to which to make driving change requests and to propose tokens to incentivize the implementation of the driving changes. In some embodiments, the processor may communicate with the two or more recipient vehicles about the proposed token and receive updated token requests as counteroffers from the recipient vehicles. In some embodiments, the processor may estimate the value of the tokens to be provided to the two or more recipient vehicles to estimate the total value of the token incentives to be provided to recipient vehicles to accomplish the task requested by the user.

In some embodiments, the processor may determine whether the respective driving change requests and proposed tokens for the two or more recipient vehicles comply with a set of traffic rules. In some embodiments, the traffic rules may relate to the route request from the user. For example, some traffic rules may relate to the number of route requests that may be made, the amount of incentives (e.g., tokens) that may be provided, the total value of incentives, the incentive value per time period, the value of the incentive provided to an individual recipient vehicle, etc. In some embodiments, the traffic rules may relate to the recipient vehicles. For example, some traffic rules may relate to the minimum speed that a recipient vehicle may slow down to on a highway, the number of recipient vehicles on a cross street that can stop to allow the user's vehicle to cross the intersection, etc. In some embodiments, the traffic rules may relate to vehicles other than the recipient vehicles. For example, some rules may relate to the number of vehicles that may drive on the right lane of a two lane highway (e.g., to prevent traffic congestion in the right lane). In some embodiments, the traffic rules may be used to safeguard the recipient vehicles and other surrounding vehicles (e.g., the nearby vehicles).

In some embodiments, the traffic rules may be obtained by using a conflict-minimizing joint optimization framework (which includes vehicles with and without goals) to find suitable vehicle trajectories, where conflicts are inferred through rule-based simulation. In some embodiments, the semantics of each rule may be represented using temporal logic rules. In some embodiments, the complete solution may capture any blocking scenarios upfront and eliminate them in the final solution trajectories. In some embodiments, the information of non-recipient vehicles may also be captured so that safety or accident risks are minimal. For example, vehicles that do not participate in any user-defined goal (e.g., commit to incentives), may be labeled as participating in a default goal in the conflict-minimizing joint optimization framework.

In some embodiments, an augmented reality viewscreen prompting the driving change may be displayed in the recipient vehicle in response to the driving change request. In some embodiments, a response from the recipient vehicle may be provided to the user vehicle via an augmented reality viewscreen in the user vehicle. In some embodiments, the augmented reality viewscreen may display an image, symbol, or textual information that indicates to the driver of the recipient vehicle to make the driving change requested. In some embodiments, the augmented reality viewscreen may provide runtime construction of augmented reality views personalized to render the appropriate image (or symbol or text) that will prompt the driver of the recipient vehicle to implement the driving changes needed. For example, the augmented reality viewscreen may be displayed on the front glass of the recipient vehicle. The viewscreen may display an image of a bump (such a speed bump) on the road to indicate to the driver to slow down (a thicker bump may indicate to slow down more), an image of a broken down vehicle on the side of the road to indicate to a driver to slow down or change lanes, an image of weather or road conditions to indicate to the driver to slow down or change lanes (e.g., rain, snow, or potholes), an image of road symbols customarily used in the locality (e.g., stop signs, yield signs, road construction signs, pedestrian crossing signs), etc. In some embodiments, the driver of the recipient vehicle may be able to change system setting to receive route guidance so that the recipient vehicle may earn more tokens or incentives.

In some embodiments, an AI model may be used to determine the image, symbol, or textual information on the augmented reality viewscreen that most effectively results in the driver of the recipient vehicle making the driving change requested. In some embodiments, the AI model may be utilized to determine the timing for displaying the image, symbol, or textual information in the augmented reality viewscreen that results in the driver of the recipient vehicle making the driving change at the most effective time (e.g., effective for the route request received from the user to be implemented).

In some embodiments, a rules-based system for predicting what augmented reality view to display and when to display the augmented reality view may be utilized. In some embodiments, the rules may be updated periodically based on the current state of the vehicle and target state of the vehicle (e.g., current and desired speed, direction, position). For example, in order to request a driving change of reduction of the speed of a vehicle from 40 mph to 20 mph in 10 seconds, an augmented reality view of a speedbump sign with a thickness of 10 mm may be shown.

In some embodiments, a classifier AI model may be trained to predict the augmented reality view for each recipient vehicle that most effectively prompts the recipient vehicle to implement the driving change requested. For example, data regarding the following information may be input into the classifier: current vehicle speed, predicted vehicle speed, predicted driving path, current traffic condition (e.g., behavior of surrounding vehicles or road conditions affecting driving conditions of vehicles), or any constraints (e.g., a desired driving path for the recipient vehicle, a desired speed for the recipient vehicle). The AI model may output augmented reality signs (e.g., image, text, symbol) to display. In some embodiments, a set of augmented reality signs output can be predefined and used as class labels which are mapped to control the speed of the vehicle. In some embodiments, a hierarchical classifier may be used to predict the augmented reality sign and attributes of the augmented reality sign (e.g., thickness/size) that may prompt the recipient vehicle's driver to implement the driving change. In some embodiments, the steps to predict the augmented reality sign (and its timing) may be repeated at specific time intervals to help the driver maintain a particular driving change (e.g., slow down and operate the vehicle at a particular speed).

In some embodiments, the processor may determine that the driving change requested complies with a safety parameter of the recipient vehicle. In some embodiments, the processor may signal to a self-driving vehicle control system in the recipient vehicle to make the driving change requested. In some embodiments, the processor may auto-configure the control system of the recipient vehicle to change the driving behavior provided safety risks for changing the driving behavior are minimal. In some embodiments, the safety parameter of the recipient vehicle may be any parameter used by driverless vehicles to determine that performing a driving operation or driving change (e.g., maintaining speed, slowing down, or changing lanes) follows safety requirements for the operation of the vehicle. In some embodiments, a self-driving vehicle may automatically pull to the side when an emergency vehicle is attempting to pass the self-driving vehicle (assuming that safety parameters are met), and the emergency vehicle may not need to provide an incentive or token for the recipient vehicle to implement the driving change.

In some embodiments, the processor may collect data regarding the recipient vehicle to model a likelihood of the recipient vehicle to implement the driving change requested. In some embodiments, the data collected may include the type of recipient vehicles, the position of the vehicle, the speed of the vehicle, other features of the vehicle, the skill level of the driver, traffic conditions, the driving scenario in which the recipient vehicle is driving (e.g., slowing down to let another vehicle pass when driving on jammed highway), etc. In some embodiments, the collected data may be stored in a database and used to train the AI model used to select recipient vehicles.

Figure 1:
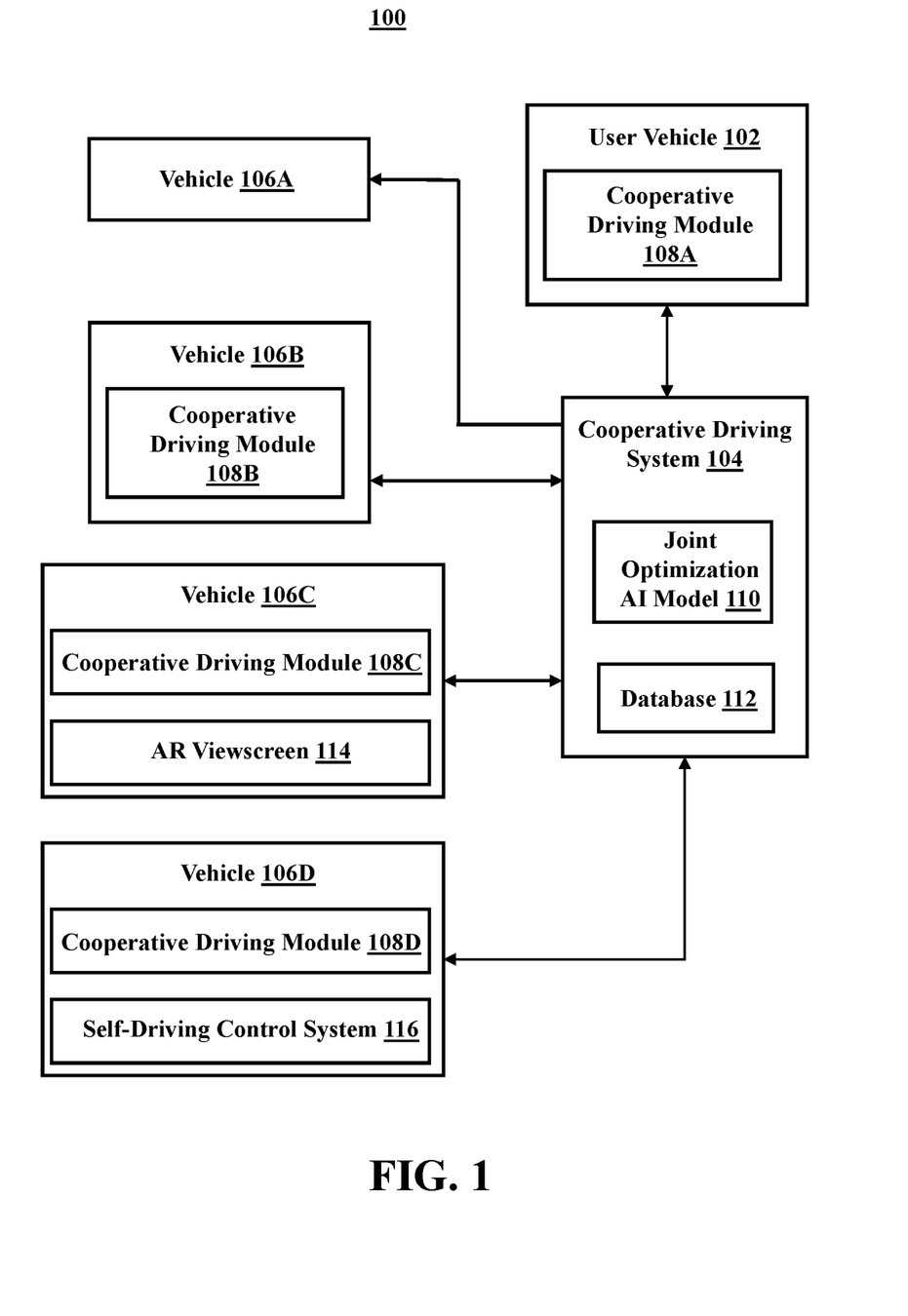
FIG. 1 illustrates a block diagram of an exemplary system for selecting recipient vehicles for driving change requests, in accordance with aspects of the present disclosure.

Referring now to FIG. 1, a block diagram of a system 100 for cooperative vehicle operation is illustrated. System 100 includes a user vehicle 102, a cooperative driving system 104, and vehicles 106A-106D. The cooperative driving system 104 is configured to be in communication with vehicles that have cooperative driving modules 108A-108D

(user vehicle 102 and vehicles 106B-106D). The cooperative driving system 104 includes a joint optimization AI model 110 and a database 112 for storing data associated with the joint optimization AI model 110 (e.g., date from cooperative driving modules 108B-108D regarding vehicles 106B-106D to model the likelihood of vehicles 106B-106D to implement requested driving changes).

In some embodiments, a processor of the cooperative driving system 104 receives a route request from the user vehicle 102. The cooperative driving system 104 also receives data associated with the predicted routes of vehicles 106A-106D from cooperative driving modules 108B-108D. In some embodiments, the cooperative driving system 104 sends a generic request to the one or more nearby vehicles 106A-106D and receives a response from vehicles 106B-106D to learn that vehicles 106B-106D are participating in cooperative driving. Data about the position, speed, and path of vehicle 106A and other traffic conditions may be obtained by sensors on vehicle 106B and transmitted to the cooperative driving system 104 using the cooperative driving module 108B of vehicle 106B.

The joint optimization AI model 110 of the cooperative driving system 104 receives the route request from the user vehicle 102 and data associated with the predicted routes of vehicles 106A-106B. The joint optimization AI model 110 utilizes the recipient selection criteria to select a recipient vehicle from vehicles 106B-106D. The joint optimization AI model 110 determines one or more driving change requests for the recipient vehicle (e.g., vehicle 106C). The one or more driving change requests and a proposed token, a proposal of a token, and/or a token are sent to the cooperative driving module 108C of the recipient vehicle. In response to vehicle 106C implementing the driving change request, a token is provided to vehicle 106C.

In some embodiments, the recipient of the driving change requests, vehicle 106C, may display an augmented reality viewscreen 114 with an image, text, or symbol prompting the driver of the vehicle to implement the driving change. In some embodiments, the recipient of the driving change request may be a self-driving vehicle such as vehicle 106D. The self-driving vehicle control system 116 may determine that the driving change requested complies with a safety parameter of the self-driving vehicle 106D. The cooperative driving system 104 may signal to the self-driving vehicle control system 116 in the recipient vehicle 106D to make the driving change requested.

In some embodiments, two or more recipient vehicles may be selected by the joint optimization AI model 110 to make driving changes (e.g., vehicles 106C and 106D). The cooperative driving system 104 may communicate with the two or more recipient vehicles 106C and 106D and generate driving change requests for each of the vehicles 106C and 106D. The cooperative driving system 104 may also generate proposed tokens for vehicles 106C and 106D to incentivize the vehicles 106C and 106D to implement the driving changes requested. Vehicles 106C and 106D may counteroffer different token amounts, types, or values from the tokens proposed by the cooperative driving system 104. The cooperative driving system 104 may estimate a combined token value to be provided to the two or more recipient vehicles 106C and 106D to implement the route request from the user. The cooperative driving system 104 may also determine whether the respective driving change requests and proposed tokens for the two or more recipient vehicles 106C and 106D comply with a set of traffic rules.

In some embodiments, the joint optimization AI model 110 may allow for the implementation of the user's goal (e.g., the route request from the user) by predicting the safety and reliability of incentivizing the driving behavior of another vehicle. Given the request from the user, a conflict-minimizing joint optimization framework may be utilized that includes vehicles with and without goals (e.g., the goals of the user vehicle and/or recipient vehicle(s)) to find suitable vehicle trajectories. In some embodiments, conflicts (e.g., safety and reliability) may be inferred through rule-based simulation. In some embodiments, the semantics of each rule can be represented using temporal logic rules. In some embodiments, the complete solution captures any blocking scenarios upfront and eliminates them in the final solution trajectories.

For example, let $S_g$ be the set of strategies for given goal g. Let $s=[lt,c]_{T\times C} \in Sg$ contains the strategy matrix of locations to be traversed by the vehicles $c \in C$ to achieve the goal g, within the time interval $t_s \leq t \leq t_e \in T$. Furthermore, $\forall c$, if $g \notin Gc$ then $\forall t$, lt,c=0, where $G_c$ is a set of goals for which vehicle c is incentivized to contribute. Its assumed that $|G_c|<1$, which means that a vehicle can commit to serving at most one goal. If a vehicle does not participate in any goal, a mock-goal is created for the vehicle. There is only one strategy matrix in the $S_g$ for the mock goal containing the normal trajectories of these vehicles. Let $\eta_c=[lt]$ be the normal trajectory of vehicle c, which it would have otherwise followed had it not committed to the incentive. The ideal scenario is that the vehicle earns the incentive without deviating much from $\eta_c$. This forms the optimization constraint. The solution space for the optimization is $S=(\Pi_g S_g)$. Let, $\sigma=(\Sigma_i^n s_i)$, where the sample point $\langle s_i \rangle \in S$ (n is number of goals and $s_i$ is the strategy matrix for the $i^{th}$ goal) is a solution over all goals for all vehicles. Let $\mathcal{F}: S \to \mathcal{R}$ be the conflict weight function which maps $\sigma$ to a real-valued weight and is a non-decreasing function. $\mathcal{F}(\sigma)$ is derived empirically by performing a simulation which enacts the steps in $\sigma$ and infers the weighted sum of conflicts resulting from that, where each conflict is associated with a weight according to the level of criticality. The optimization problem minimizes the conflict while ensuring there is at least $\tau$ similarity between the normal and deviating trajectories of the vehicle. It is formulated as follows:

$$\min_{\{\sigma \in S\}} \mathcal{F}(\sigma),$$

such that $\forall c$, $\pi(\sigma,c) \cdot \eta_c > \tau$ (Here, $\pi(\sigma,c)$ is the projection of column vector for vehicle c in matrix $\sigma$). This problem is NP-Complete and can be solved using approximate solvers such as greedy hill climbing to arrive at an approximate solution.

In some embodiments, the conflict inference simulation may be performed by applying predefined rules (that may be obtained from best practices of traffic rules) for enactment of the location trajectories of the vehicles specified in the matrices in $\sigma$.

In some embodiments, rules (associated with weights of importance) may be expressed as temporal logic expressions that capture the semantics of conflict, safety and reliability to automatically identify the anomalous events (e.g., a set of vehicles which increases traffic congestion on a road for other vehicles) and blocks them by learning over the time. Some examples of rules are below: SameLane($l_c,l_{\hat{c}}$)$\wedge$ ($l_c$<$l_{\hat{c}}$)→(‖$l_c$−$l_{\hat{c}}$‖≥υ) indicates that distance between any two vehicles should be at least υ, if both of them are in same lane and vehicles c follows $$\hat{c}; \frac{dl_c}{dt} \leq 30 \cup SpeedLimit40Kmph$$

indicates that the vehicles should not drive at a speed greater than 30 kmph until it reaches a 40 kmph speed limit region.

In some embodiments, the simulation may start a global clock and plays out each of the trajectories of the vehicles (which happen to be column vectors of the matrices in σ). At each time step, the temporal logic rules may be applied to evaluate whether any violation has occurred. If a violation has occurred, then the weights are added to a global conflict-weight counter. Once the simulation is completed, the total conflict-weight counter's value is returned.

Figure 2:
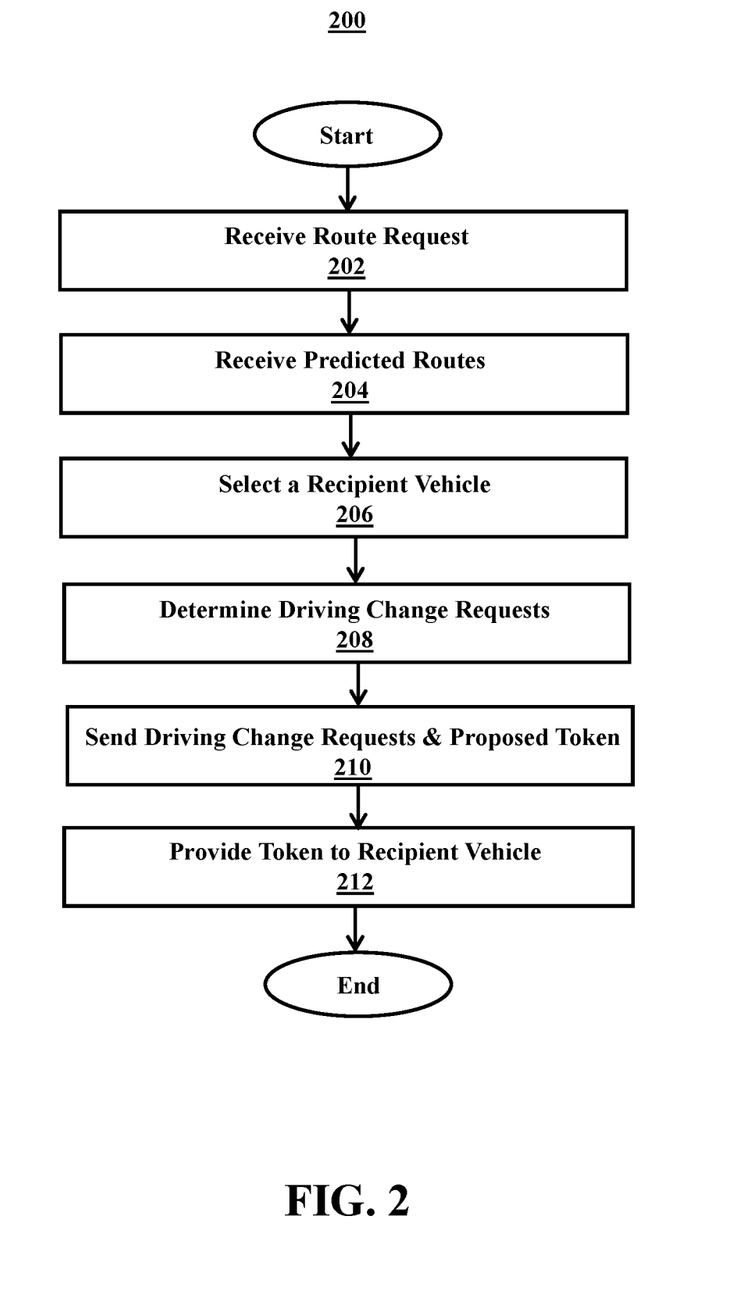
FIG. 2 illustrates a flowchart of an exemplary method system for selecting recipient vehicles for driving change requests, in accordance with aspects of the present disclosure.

Referring now to FIG. 2, illustrated is a flowchart of an exemplary method 200 for cooperative vehicle operation, in accordance with embodiments of the present disclosure. In some embodiments, a processor of a system may perform the operations of the method 200. In some embodiments, method 200 begins at operation 202. At operation 202, the processor receives a route request from a user. In some embodiments, method 200 proceeds to operation 204, where the processor receives data associated with predicted routes of one or more nearby vehicles. In some embodiments, method 200 proceeds to operation 206. At operation 206, the processor selects a recipient vehicle from the one or more nearby vehicles based on recipient selection criteria. In some embodiments, method 200 proceeds to operation 208. At operation 208, the processor determines one or more driving change requests for the recipient vehicle. In some embodiments, method 200 proceeds to operation 210. At operation 210, the processor sends the one or more driving change requests and a proposed token to the recipient vehicle. In some embodiments, method 200 proceeds to operation 212. At operation 212, the processor provides a token to the recipient vehicle in response to the recipient vehicle implementing the driving change requested.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
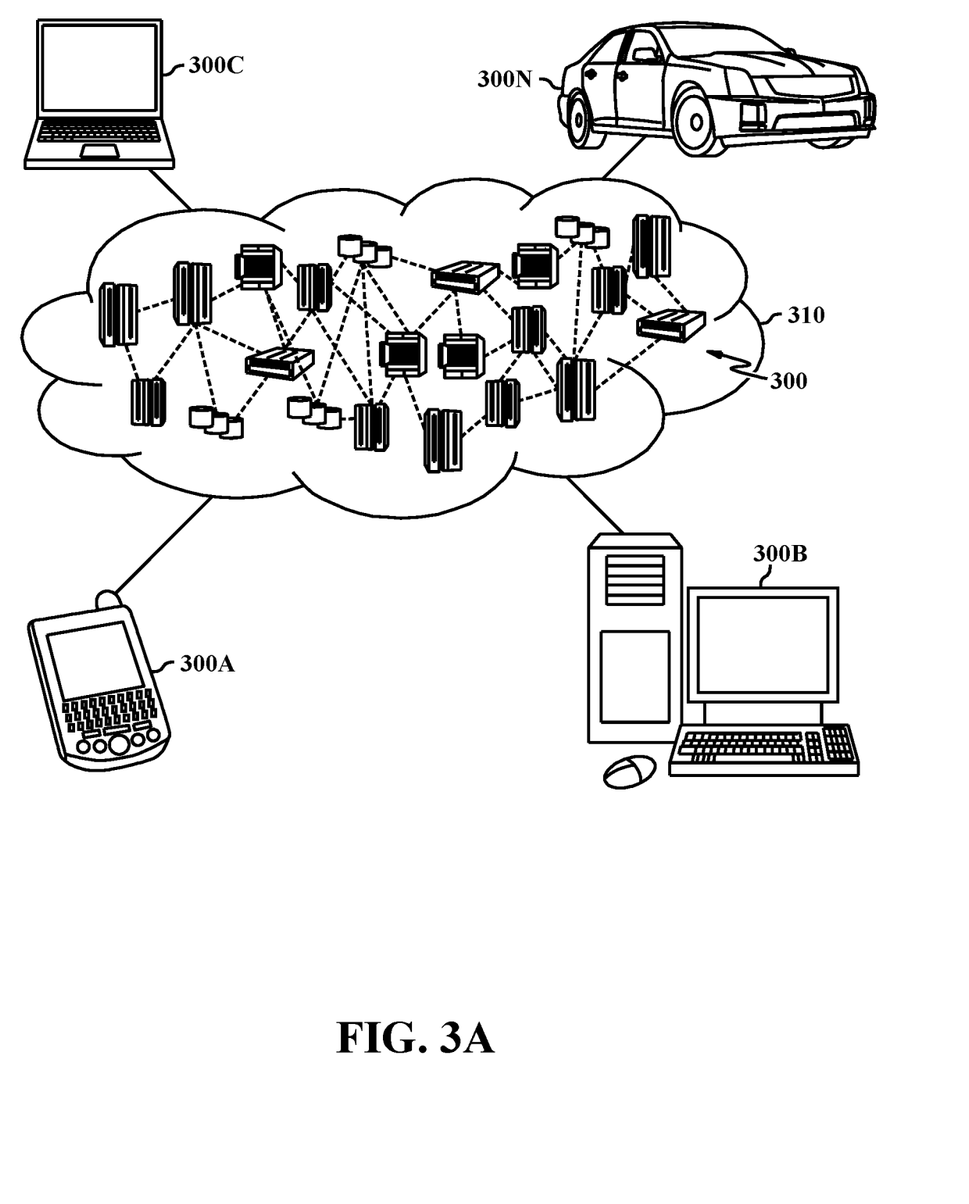
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
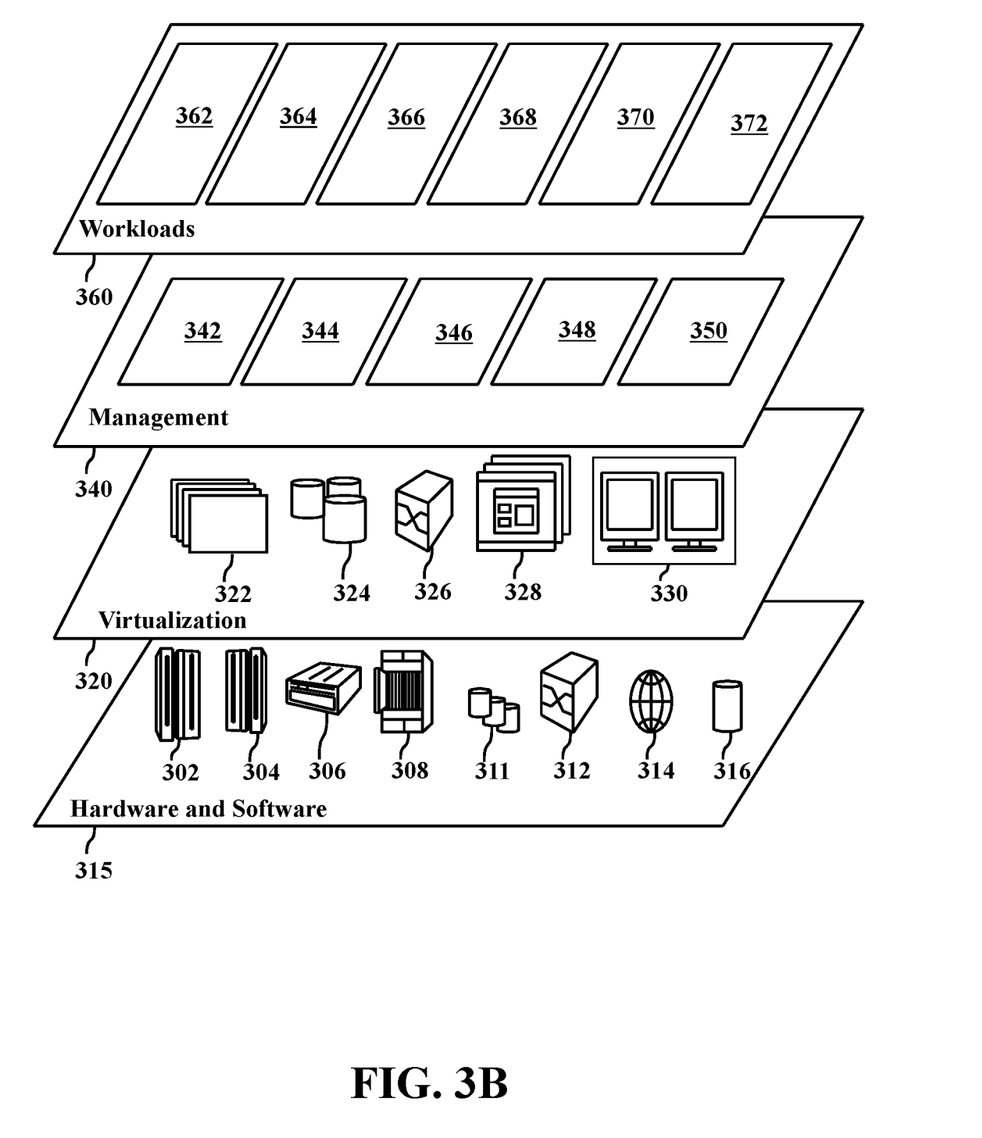
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and cooperative vehicle operation 372.

Figure 4:
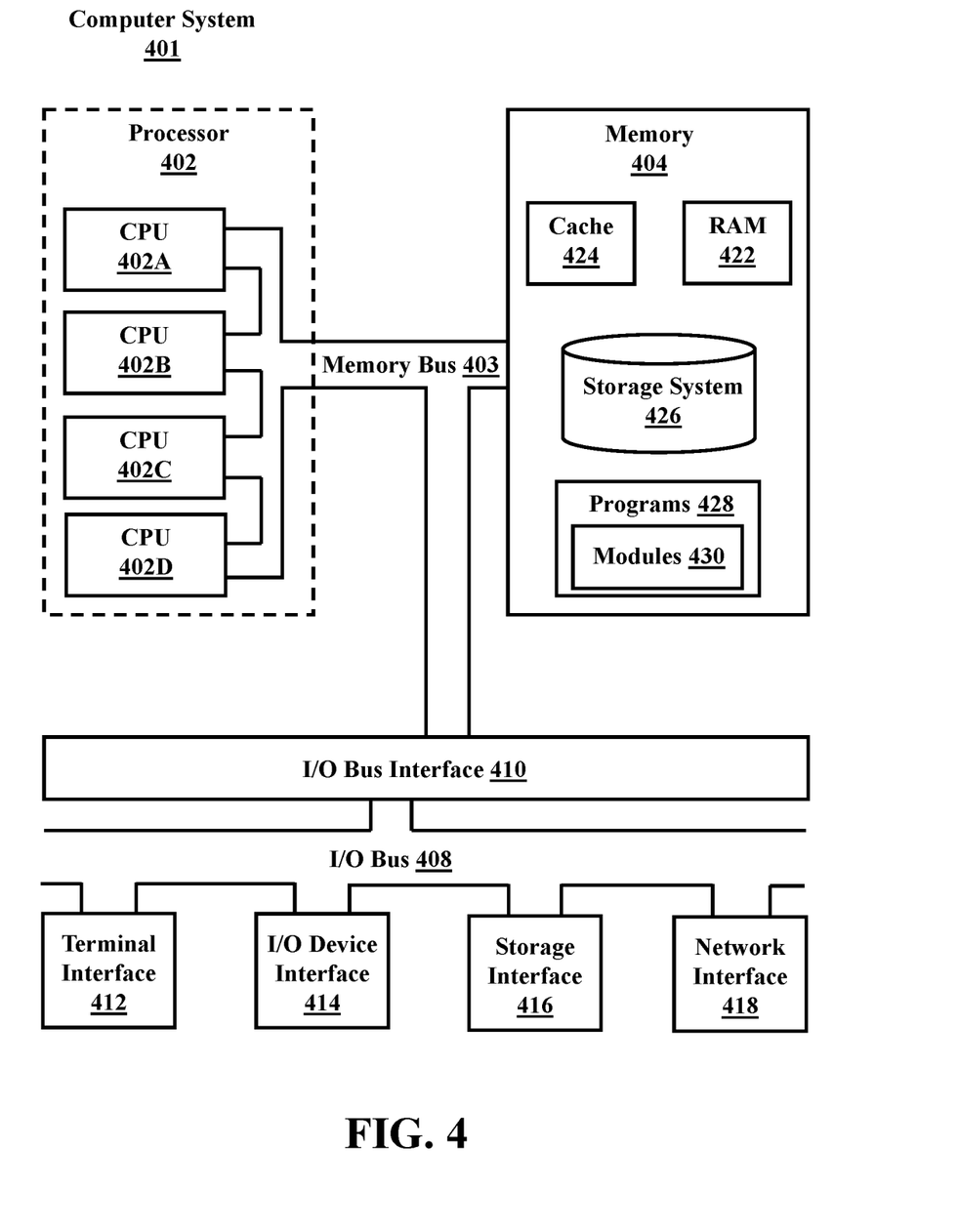
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for cooperative vehicle operation, the method comprising:
    receiving, by a processor, a route request from a user for a first vehicle, which includes a goal of the user associated with the first vehicle;
    receiving, by the processor, data associated with predicted routes and goals of one or more nearby vehicles;
    performing, by the processor, a prediction of a likelihood of the one or more nearby vehicles implementing a driving change request based on a joint optimization artificial intelligence (AI) model configured to analyze recipient selection criteria that includes the route request and goal from the user, and the predicted routes and goals of the one or more nearby vehicles, safety of making the driving change, and past participation in cooperative vehicle operation;
    selecting, by the processor, a recipient vehicle from the one or more nearby vehicles, wherein the recipient vehicle is selected based on the recipient selection criteria, and wherein the joint optimization AI model predicts which of the nearby vehicles are most likely to implement the driving change and minimize conflict between implementing the driving change and a goal of the recipient vehicle;
    determining, by the processor, one or more driving change requests for the recipient vehicle, wherein the one or more driving change requests consider rules and safety, and goals associated with the recipient vehicle and accomplish the route request of the first vehicle; and
    in response to the determined one or more driving change requests, displaying, by the processor, an augmented reality viewscreen in the recipient vehicle for prompting the driving change in the recipient vehicle, wherein the displaying comprises:
        using current vehicle and traffic condition data, training a classifier AI model to predict an augmented reality view for the recipient vehicle, and
        using the trained classifier AI model, generating augmented reality signs to be displayed on the augmented reality viewscreen for indicating the recipient vehicle to execute the one or more driving change requests; and
    executing the one or more driving change requests by a self-driving vehicle control system to cause the recipient vehicle to change speed, change position, or change path.

2. The method of claim 1, wherein the generated augmented reality signs include at least one of an image, a text, or a symbol that most effectively prompts the recipient vehicle to implement the one or more driving change requests, and wherein displaying the augmented reality viewscreen in the recipient vehicle further comprises:
    using the trained classifier AI model, determining an effective timing to display the augmented reality signs on the augmented reality viewscreen for indicating the recipient vehicle to execute the one or more driving change requests; and
    repeating the generating of the augmented reality signs at specific time intervals to prompt the recipient vehicle to maintain a particular driving change requests.

3. The method of claim 1, further comprising:
    determining that the driving change requested complies with a safety parameter of the recipient vehicle; and
    signaling to a self-driving vehicle control system in the recipient vehicle to make the driving change requested.

4. The method of claim 1, wherein the recipient selection criteria include at least one of safety of the recipient vehicle to implement the driving change, and a predicted likelihood of the recipient vehicle to implement the driving change.

5. The method of claim 1, further comprising collecting data regarding the recipient vehicle to model a likelihood of the recipient vehicle to implement the driving change requested.

6. A system for cooperative vehicle operation, the system comprising:
a memory; and
a processor in communication with the memory, the processor being configured to perform operations comprising:
receiving a route request from a user for a first vehicle, which includes a goal of the user associated with the first vehicle;
receiving data associated with predicted routes of one or more nearby vehicles;
performing a prediction of a likelihood of the one or more nearby vehicles implementing a driving change request based on a joint optimization artificial intelligence (AI) model configured to analyze recipient selection criteria that includes the route request and goal from the user, and the predicted routes and goals of the one or more nearby vehicles, safety of making the driving change, and past participation in cooperative vehicle operation;
selecting a recipient vehicle from the one or more nearby vehicles, wherein the recipient vehicle is selected based on recipient selection criteria, and wherein the joint optimization AI model predicts which of the nearby vehicles are most likely to implement the driving change and minimize conflict between implementing the driving change and a goal of the recipient vehicle;
determining one or more driving change requests for the recipient vehicle, wherein the one or more driving change requests consider rules, safety, and goals associated with the recipient vehicle and accomplish the route request of the first vehicle;
in response to the determined one or more driving change requests, displaying, by the processor, an augmented reality viewscreen in the recipient vehicle for prompting the driving change in the recipient vehicle, wherein the displaying comprises:
using current vehicle and traffic condition data, training a classifier AI model to predict an augmented reality view for the recipient vehicle, and
using the trained classifier AI model, generating augmented reality signs to be displayed on the augmented reality viewscreen for indicating the recipient vehicle to execute the one or more driving change requests; and
executing the one or more driving change requests by a self-driving vehicle control system to cause the recipient vehicle to change speed, change position, or change path.

7. The system of claim 6, wherein the generated augmented reality signs include at least one of an image, a text, or a symbol that most effectively prompts the recipient vehicle to implement the one or more driving change requests, and wherein the processor is further configured to perform operations comprising:
using the trained classifier AI model, determining an effective timing to display the augmented reality signs on the augmented reality viewscreen for indicating the recipient vehicle to execute the one or more driving change requests; and
repeating the generating of the augmented reality signs at specific time intervals to prompt the recipient vehicle to maintain a particular driving change requests.

8. The system of claim 6, the processor being further configured to perform operations comprising:
determining that the driving change requested complies with a safety parameter of the recipient vehicle; and
signaling to a self-driving vehicle control system in the recipient vehicle to make the driving change requested.

9. The system of claim 6, wherein the recipient selection criteria include at least one of safety of the recipient vehicle to implement the driving change, and a predicted likelihood of the recipient vehicle to implement the driving change.

10. The system of claim 6, the processor being further configured to perform operations comprising: collecting data regarding the recipient vehicle to model a likelihood of the recipient vehicle to implement the driving change requested.

11. A computer program product comprising a computer readable storage medium having program instructions embodied therewith, the program instructions executable by a processor to cause the processor to perform operations, the operations comprising:
receiving a route request from a user for a first vehicle, which includes a goal of the user associated with the first vehicle;
receiving data associated with predicted routes of one or more nearby vehicles;
performing a prediction of a likelihood of the one or more nearby vehicles implementing a driving change request based on a joint optimization artificial intelligence (AI) model configured to analyze recipient selection criteria that includes the route request and goal from the user, and the predicted routes and goals of the one or more nearby vehicles, safety of making the driving change, and past participation in cooperative vehicle operation;
selecting a recipient vehicle from the one or more nearby vehicles, wherein the recipient vehicle is selected based on recipient selection criteria, and wherein the joint optimization AI model predicts which of the nearby vehicles are most likely to implement the driving change and minimize conflict between implementing the driving change and a goal of the recipient vehicle;
determining one or more driving change requests for the recipient vehicle, wherein the one or more driving change requests consider rules, safety, and goals associated with the recipient vehicle and accomplish the route request of the first vehicle;
in response to the determined one or more driving change requests, displaying, by the processor, an augmented reality viewscreen in the recipient vehicle for prompting the driving change in the recipient vehicle, wherein the displaying comprises:
using current vehicle and traffic condition data, training a classifier AI model to predict an augmented reality view for the recipient vehicle, and
using the trained classifier AI model, generating augmented reality signs to be displayed on the augmented reality viewscreen for indicating the recipient vehicle to execute the one or more driving change requests; and
executing the one or more driving change requests by a self-driving vehicle control system to cause the recipient vehicle to change speed, change position, or change path.

12. The computer program product of claim 11, wherein the generated augmented reality signs include at least one of an image, a text, or a symbol that most effectively prompts the recipient vehicle to implement the one or more driving change requests, and wherein the processor is further configured to perform operations comprising:

using the trained classifier AI model, determining an effective timing to display the augmented reality signs on the augmented reality viewscreen for indicating the recipient vehicle to execute the one or more driving change requests; and repeating the generating of the augmented reality signs at specific time intervals to prompt the recipient vehicle to maintain a particular driving change requests.

13. The computer program product of claim 11, the processor being further configured to perform operations comprising:

determining that the driving change requested complies with a safety parameter of the recipient vehicle; and signaling to a self-driving vehicle control system in the recipient vehicle to make the driving change requested.

14. The computer program product of claim 11, the processor being further configured to perform operations comprising: collecting data regarding the recipient vehicle to model a likelihood of the recipient vehicle to implement the driving change requested.

* * * * *